(12) United States Patent
Dominissini et al.

(10) Patent No.: US 7,677,595 B2
(45) Date of Patent: Mar. 16, 2010

(54) CURTAIN AIRBAG MOUNTING DEVICE (75) Inventors: David L. Dominissini, Allen Park, MI (US); Brian T. Shellabarger, Detroit, MI (US)

(73) Assignee: Autoliv ASP, Inc., Ogden, UT (US)

( * ) Notice: Subject to any disclaimer, the term of this patent is extended or adjusted under 35 U.S.C. 154(b) by 231 days.

(21) Appl. No.: 12/009,540

(22) Filed: Jan. 18, 2008

(65) Prior Publication Data
US 2009/0184494 A1 Jul. 23, 2009

(51) Int. Cl.
*B60R 21/213* (2006.01)
(52) U.S. Cl. ............... 280/728.2; 280/730.2; 280/743.2; 248/200; 248/220.21
(58) Field of Classification Search ............... 280/728.2, 280/730.2, 743.2, 736; 248/200, 220.21, 248/213.1, 214, 231.81, 231.85, 309.1, 503
See application file for complete search history.

(56) References Cited

U.S. PATENT DOCUMENTS

| 5,860,673 A | * | 1/1999 | Hasegawa et al. ......... 280/730.2 |
| 6,612,610 B1 | * | 9/2003 | Aoki et al. ............... 280/730.2 |
| 6,945,554 B2 | | 9/2005 | Henderson et al. |

FOREIGN PATENT DOCUMENTS

| GB | 2 397 806 A | 8/2004 |
| WO | WO-2004/101328 A1 | 11/2004 |

* cited by examiner

*Primary Examiner*—Ruth Ilan
*Assistant Examiner*—Keith Frisby
(74) *Attorney, Agent, or Firm*—Sally J Brown; Madison IP, P.C.

(57) ABSTRACT

An apparatus for mounting an airbag inflator to a vehicle includes a mounting adapter. The mounting adapter includes a base and at least one slot, wherein the base captures the inflator. A p-bracket that engages the slot is also added, wherein the p-bracket captures the inflator. A mounting tether is also looped around the p-bracket. A tether retainer or a wire harness retainer may also be added to the adapter.

16 Claims, 4 Drawing Sheets

CURTAIN AIRBAG MOUNTING DEVICE

BACKGROUND OF THE INVENTION

Airbag systems are commonly used in motor vehicles. In fact, the inclusion of airbag systems onto motor vehicles has been credited with saving literally thousands of lives. Because of the added safety benefits associated with airbags, regulations have been promulgated in many jurisdictions requiring the inclusion of airbag systems on all new vehicles.

Airbag systems are designed such that in the event of an accident or crash, one or more airbags will be inflated and deployed. Once inflated/deployed, the airbag becomes positioned in the interior of the vehicle in a position that provides impact protection to the vehicle occupant(s). More specifically, the inflated airbag becomes positioned such that during the crash, the occupant impacts the airbag rather than the vehicle's steering wheel, dashboard, lateral side, door, etc. As the inflated airbag is generally "softer" than the hard surfaces of the vehicle, having the occupant impact the airbag rather than the vehicle surfaces greatly reduces the likelihood that the occupant will be injured in the crash.

"Inflatable curtain" airbag systems are a particular type of airbag that has received recent attention. (These systems are also referred to as "side-curtain" airbag systems.) Inflatable curtain airbags are designed to be mounted above the vehicle door. In the event of an accident or crash, the inflatable curtain airbag system will inflate the airbag downward to cover the door and lateral side of the vehicle, thereby preventing the vehicle occupant from harmful impact with the vehicle door/side. When inflated, inflatable curtain airbag systems may also prevent the vehicle occupant's head, arms, torso, etc. from being thrown out of an open vehicle window during a crash.

Most airbag systems, including inflatable curtain airbag systems, include an inflator (which is sometimes called an "airbag inflator"). An inflator is a device that is designed to produce and/or channel a large volume of inflation gas into the airbag in the event of an accident or crash. Such an influx of gas into the airbag causes the airbag to inflate and deploy. Inflators are generally cylindrical in shape.

In general, the inflator used as part of an inflatable curtain airbag system is generally mounted on the vehicle proximate to the inflatable curtain airbag via a mounting bracket. This mounting bracket may be affixed to the vehicle via bolts or other fasteners.

As part of this attachment process, the inflator will first be "staged" to the vehicle. This means that the inflator and the inflator mounting bracket are positioned onto the vehicle by inserting a portion of the mounting bracket into a hole or opening positioned on the vehicle. Once the bracket and the inflator have been staged into the proper position, torque will be applied to the bolts to secure the bolts to the vehicle and securely affix the inflator (and the mounting bracket) to the vehicle.

Unfortunately, mounting brackets for some inflators are expensive to manufacture and/or purchase. This is especially true for inflators that are used with inflatable curtain airbag systems. In fact, such usage of these expensive mounting brackets in inflatable curtain airbag systems contributes greatly to the overall cost of manufacturing the airbag system. Accordingly, finding a new type of bracket that is less expensive would be advantageous.

Further, in order to "stage" the mounting bracket/inflator to the vehicle, the mounting bracket must include long hooks that will engage holes in the vehicle. However, the exact location of these holes on each particular vehicle type varies depending on the type of vehicle, the size of the vehicle, the size/shape of the inflator, etc. As a result, not all types of mounting brackets can be used with all types of vehicles. Rather, it is not uncommon for each type of vehicle to have its own specific inflator mounting bracket—i.e., an inflator mounting bracket that has been specially designed so that it will fit into the staging holes (and hole locations) that are particular to that vehicle design. Further, the fixed position of the staging holes on the vehicle drastically limits the ability of airbag manufacturers to change the orientation, arrangement, and/or position of the inflatable curtain on the vehicle.

Designing and using a new inflator mounting bracket for each type of vehicle design significantly increases the overall production costs of the airbag system. Accordingly, it would provide a significant cost savings if a new type of inflator mounting bracket could be designed that may be used on a variety of different vehicle models and designs. Further, it would be an advancement to provide a bracket that would provide a mechanism for the airbag manufacturer to readily change the orientation, alignment, arrangement, etc. of the inflatable curtain airbag. Such a new type of inflator mounting assembly is disclosed herein.

BRIEF SUMMARY OF THE INVENTION

An apparatus for mounting an airbag inflator to a vehicle is disclosed. The apparatus comprises a mounting adapter. The mounting adapter comprises a base and at least one slot, wherein the base captures the inflator. A p-bracket that engages the slot is also added. The p-bracket captures the inflator. A mounting tether is also added. The mounting tether is looped around the p-bracket. In some embodiments, the adapter receives a label, wherein the label is positioned on an encircling portion of the adapter. In other embodiments, a tether retainer is added that retains slack in the tether. Additional embodiments are designed in which the tether retainer comprises an opening and a portion of the tether is pushed into the opening. Further embodiments are designed in which a wire harness is added, wherein the wire harness is retained by the adapter. In some embodiments, the adapter comprises a flange that includes a cutout, wherein the wire harness is retained by threading the wire through the cutout. In yet additional embodiments, an eyelet loop is added, wherein the adapter holds the eyelet loop against the inflator.

Other embodiments may relate to an apparatus for mounting an airbag inflator to a vehicle. In these embodiments, the apparatus comprises a mounting adapter. The mounting adapter comprises a base and two slots. The base captures the inflator. Two p-brackets are also added, wherein each of the p-brackets engage a different slot. Each of the p-brackets captures the inflator. A mounting tether is also added. The mounting tether includes an eyelet loop, wherein the eyelet loop is looped around the p-bracket. A tether retainer is also added. The tether retainer retains slack found in the tether, wherein the tether retainer comprises an opening. In some embodiments, the apparatus further comprises a wire harness retained by the adapter, wherein the adapter comprises a flange that includes a cutout, wherein the wire harness is retained by threading the wire through the cutout. In additional embodiments, the apparatus further comprises a tab that engages an anti-twist feature positioned on an airbag sock.

Further embodiments teach a method for attaching an airbag inflator to a vehicle. In these embodiments, the method comprises the step of obtaining a mounting apparatus, the apparatus comprising a mounting adapter comprising a base and at least one slot, wherein the base captures the inflator, a p-bracket that engages the slot, wherein the p-bracket captures the inflator, and a mounting tether looped around the p-bracket. The method also includes the step of staging the inflator to the vehicle using the mounting apparatus by inserting a push pin into an opening on a vehicle surface. The method also includes the step of securing the mounting apparatus to the vehicle via one or more bolts. In further embodiments, the step of staging the inflator comprises engaging the apparatus with one or more holes in the vehicle.

The present embodiments relate to a new type of mounting apparatus that may be used to mount or affix an inflator to a vehicle. This apparatus is designed to position the inflator so that it may be used as part of an inflatable curtain airbag system. In general, the inflator will be mounted on or proximate the lateral side of the vehicle.

The mounting apparatus includes an adapter that receives the inflator. This adapter may serve to house the inflator once the inflator has been mounted. The adapter in general will include a base that will be attached to the vehicle. An encircling portion may also be included as part of the adapter. The encircling portion is designed to capture, enclose and/or encircle all or portion of the inflator. One or more slots may also be positioned on the base of the adapter.

In some embodiments, the encircling portion provides a smooth, uninterrupted space that can receive a label, such as a "warning" label, a disclaimer, a "caution" label, an "instruction" label, a "bar code," etc. This space for receiving the label may be advantageous as it provides the airbag manufacturer with a convenient and accessible location for adding the requisite disclaimers/labels to the airbag inflator.

A p-bracket may also be used with the adapter as part of the mounting apparatus. The location of the p-bracket may correspond to the location of the slots in the adapter. The p-bracket may be of the type known in the art and may have a portion that encircles the inflator. The p-bracket may further comprise a head portion that may be secured to the base via one or more fasteners.

An airbag tether may also be secured to the adapter. This may be accomplished by having the tether include an eyelet loop, and then "looping" the eyelet loop around the p-bracket. (The eyelet loop is sometimes referred to herein as the "loop"). The adapter may also operate to mount the tether to the vehicle without the use of a separate mounting bracket/feature. Rather, because the tether is secured to the adapter, affixing the adapter to the vehicle operates to secure the tether to the vehicle as well. In some embodiments, the adapter may also include a flange that holds the tether proximate the inflator to ensure that the tether (or the tether loop) is not pinched or trapped between the vehicle body and the adapter.

The mounting apparatus may further include an opening into which a portion of the tether may be inserted. The purpose of inserting the tether in this manner is to remove all or a portion of the "slack" that may exist in the tether. If the tether is allowed to loosely hang, with an abundance of slack, the tether could potentially interfere with the proper installation of the adapter. Accordingly, in order to compensate for slack in the tether, the tether is inserted into the opening. Of course, when the airbag system is deployed, the tether will exit the opening and will fully extend.

Once the inflator and/or the tether have been added to the adapter, the adapter may be "staged" to the vehicle surface. "Staging" the adapter, as noted above, means that the adapter is positioned on the vehicle surface prior to having the adapter permanently affixed via bolts, fasteners, etc. This "staging" of the adapter may occur by inserting a push pin through an opening in the adapter and then engaging this push pin with a hole or opening on the vehicle surface. Openings on the vehicle surface and/or the adapter may readily be created. Accordingly, the airbag installer may, if necessary, change the position, angle, configuration, orientation, etc. of the "staged" adapter by simply creating a new opening in the vehicle surface and/or the adapter. Thus, the installer has great flexibility to stage the adapter in a variety of different configurations, positions, orientations, etc. without the risk that the staged adapter will fall out of its mount. In turn, this flexibility means that the adapter can readily be staged in a variety of different vehicles of all shapes and sizes.

After the adapter has been staged, the adapter and/or the inflatable curtain airbag system may be permanently affixed to the vehicle surface via one or more fasteners. Mounting brackets may also be added to mount the inflatable curtain (and/or other elements of the inflatable curtain airbag system). However, because the inflator has already been staged, these mounting brackets may be less-expensive brackets that do not have any type of staging hooks, push pins, etc.

Further embodiments of the mounting apparatus may also include a wire harness retainer. A wire harness comprises wiring and other electrical elements often used with the inflator, the inflatable curtain airbag system, and/or other vehicle systems (including electrical systems of the vehicle). Accordingly, the present embodiments may include a retainer that retains the wire harness and ensures that the wire harness is positioned properly. In some embodiments, this retainer comprises a flange that includes a cutout, wherein the wire harness is passed through the cutout. Additional embodiments of the mounting apparatus may be constructed in which the adapter comprises a tab that facilitates the operation of an anti-twist feature on the inflatable curtain to ensure that this feature functions properly. In some embodiments, this may occur by having the tab engage the sock and/or the anti-twist feature.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 1:
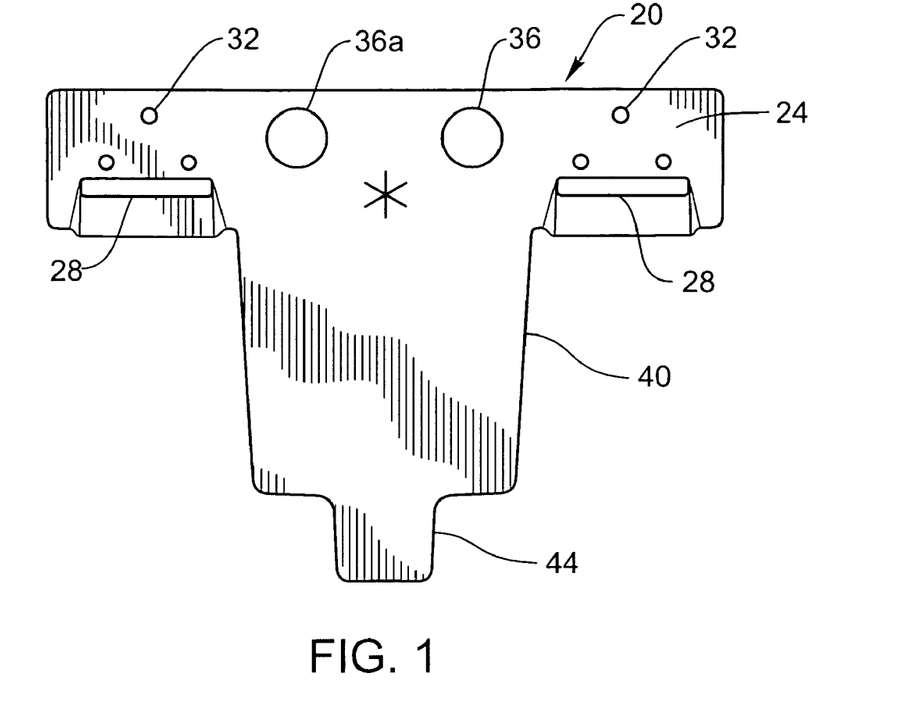
FIG. 1 is a plan view of an adapter in a generally planar configuration according to the present embodiments.
Figure 1A:
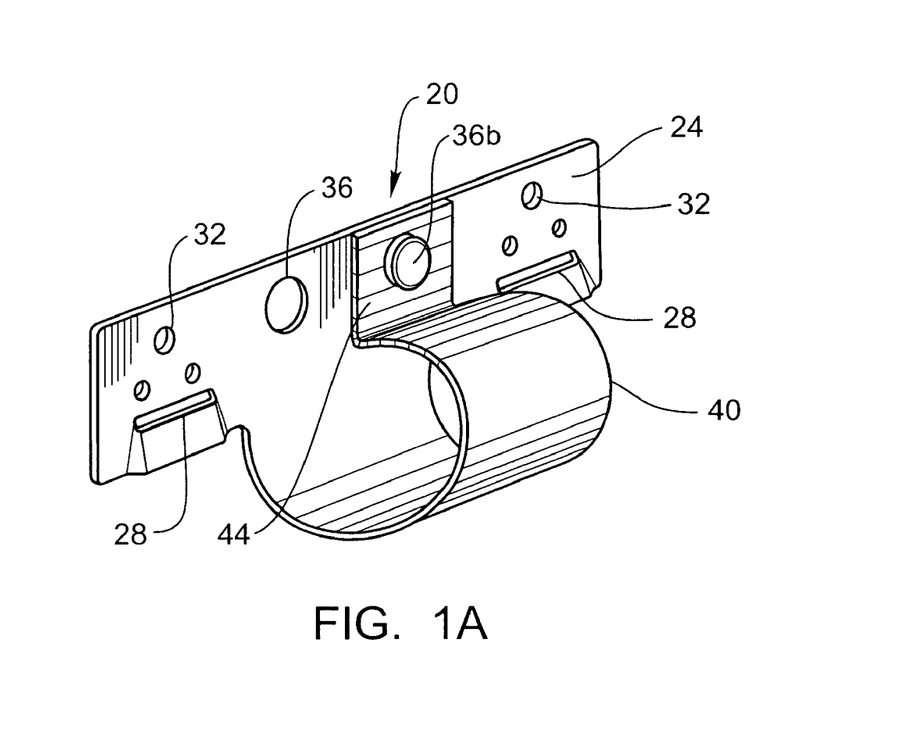
FIG. 1A is a perspective view that shows the adapter of FIG. 1 with a portion rolled to hold an inflator.

Referring now to FIG. 1 and FIG. 1A, a mounting adapter 20 is illustrated. FIG. 1A is a perspective view of the adapter 20 whereas FIG. 1 is a plan view of the adapter 20 (that shows the adapter 20 in a generally planar configuration). The mounting adapter 20 may be used to mount an inflator (not shown in FIG. 1) to a vehicle (not shown). More specifically, the mounting adapter 20 is designed to mount an inflator as part of an inflatable curtain airbag system. The adapter 20 may, in some embodiments, be a mounting bracket. The mounting adapter 20 may be made of metal (such as steel) or other similar materials. Other embodiments may be designed in which the material used for the adapter is polyethylene (such as low density polyethylene).

The mounting adapter 20 includes a base 24 that is designed to be mounted to a vehicle interior. The base 24 may include one or more slots 28. The slots 28 may engage a "p-bracket" (not shown) that engage and/or capture the inflator. The base 24 may additionally include one or more p-bracket holes 32 that are designed to receive the fasteners (not shown). Other openings 36 on the adapter 20, including a "trim mounting" clearance hole 36a, may also be added as desired. Additional openings 36, which are not shown in FIG. 1, may further be added to the adapter 20 (and/or the base 24). The mounting adapter 20 may further include an encircling portion 40. In some embodiments, the encircling portion 40 may be designed such that it can capture and/or surround a portion of the inflator. More specifically, once the inflator is positioned in the adapter 20, the encircling portion 40 may be wrapped around the inflator as a means of securing the inflator within the adapter 20. A tongue 44 may optionally be added at the end of the encircling portion 40. In some embodiments, the tongue 44 may engage the base 24 after the inflator has been positioned inside of the encircling portion 40. The tab 44 is shown pointing "up" —i.e., extending upward from the encircling portion 40. However, other embodiments may be made in which the tab 44 may point or extend downward from the encircling portion 40. Further, as shown in FIG. 1A, embodiments may be constructed in which a push pin 36b may be inserted into a hole 36a as a means of attaching a tab or tongue 44 to the adapter, thus providing a means to capture the inflator (not shown in FIG. 1A).

Figure 2:
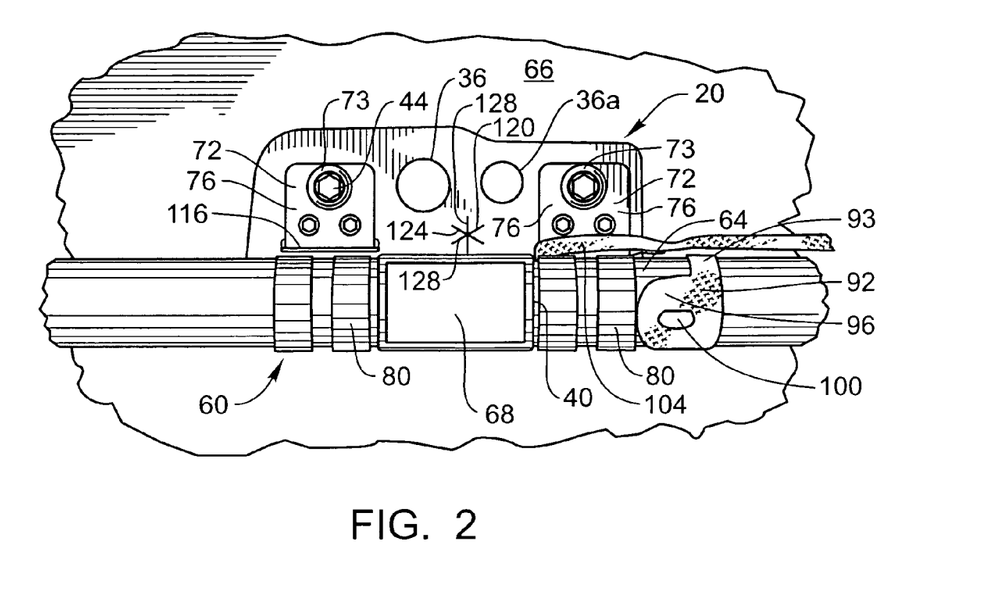
FIG. 2 is a perspective view of the front side of an apparatus that incorporates the adapter of FIG. 1 that may be used to mount an inflator to a vehicle as part of an inflatable curtain airbag system.

Referring now to FIG. 2, an apparatus 60 that may be used to mount an airbag inflator 64 to a vehicle interior is illustrated. The apparatus 60 includes the mounting adapter 20 of FIG. 1. As shown in FIG. 2, the encircling portion 40 may capture all or a portion of the inflator 64. Once the inflator 64 is encircled by the encircling portion 40, the base 24 may then be attached to a vehicle interior.

The apparatus 60 of FIG. 2 may be "staged" and subsequently mounted to a vehicle surface 66 (which may be the body of the vehicle). This "staging" and mounting procedure will be described in greater detail herein.

The use of an encircling portion 40 may, in some embodiments, provide additional advantages. Specifically, a label 68 may be added to the encircling portion 40 or other areas of the adapter 20. This area on the encircling portion 40 allows for a smooth surface that receives the label 68. The label 68 may include a "caution" or "warning" label that is commonly placed on the inflator 64. (In general, these "warning" labels can warn persons regarding inappropriate and/or improper use of the inflator or airbag system). Further embodiments may be designed in which the label 68 includes a "bar code" or other similar feature used to track inventory or identify the particular inflator. Other embodiments are designed in which the label is an "instruction" label that discloses instructions regarding the use, maintenance, or repair of the airbag system (or any other topic as desired). These and/or other labels may be required depending upon the particular jurisdiction.

In some embodiments, the inclusion of the label 68 on the encircling portion 40 provides a flat, easily accessible surface onto which the label may be mounted. In some previously known mounting brackets that receive "p-brackets," there was no adequate surface that was flat, smooth, uninterrupted, etc. that would facilitate mounting all of the labels required by some jurisdictions. As such, airbag producers found it difficult to mount all of the required labeling. However, by placing the label 68 on the encircling portion (or another smooth surface of the adapter 20), this problem is obviated and all of the required labels can easily be included with the airbag inflator 64.

The apparatus 60 of FIG. 2 may further include one or more "p-brackets" 72, which may be of the type known in the art. A p-bracket 72 is a bracket that has a head portion 76 that may be mounted to the base 24. In some embodiments, the p-bracket 72 is secured to the adapter via one or more fasteners 73 which may pass through the p-bracket holes 32. These fasteners may be M6 bolts with pushnuts, as are known in the art. Other types of fasteners 73 are also possible as well. Of course, other ways for attaching or securing the p-bracket 72 to the adapter 20 may also be used.

The p-bracket 72 also includes a looping portion 80 that captures a portion of the inflator 64. The looping portion 80 is attached to the head portion 76. In some embodiments, two p-brackets 72 are used and will be positioned such that the position of the p-bracket 72 corresponds to the position of the slots 28 (shown in FIG. 1). In some embodiments, the looping portion 80 will engage and/or be passed through the slots 28, after it has looped around or captured the inflator 64. Two p-brackets are illustrated as capturing the inflator 64. More or less than two p-brackets 72 are also possible.

One or more mounting tethers 92 may also be included as part of the mounting apparatus 60. These tethers 92, as known in the art, are made of a flexible material and are attached to the inflatable curtain (not shown in FIG. 2). These tethers 92 operate to guide and/or restrain the movement of the inflatable curtain during deployment. The purpose of the tether 92 is to anchor the inflatable curtain to the vehicle and to ensure that, during deployment, the inflatable curtain becomes positioned along the side of the vehicle in the desired location. Further, the deployed tether 92 may hold the inflatable curtain in the proper position during the impact event.

The tether 92 may be attached and/or mounted to the adapter 20. In some embodiments, the tether 92 is further secured to the inflator 64. In the embodiment of FIG. 2, the tether 92 includes a rolled section 96. This is a portion of the tether that has been rolled, gathered, or otherwise compacted for convenient storage. When the airbag system is deployed, the rolled section 96 will unroll so that the inflatable curtain becomes properly positioned. The length, thickness, strength, etc. of the tether 92 will, of course, depend upon the particular embodiment. In some embodiments, the adapter 20 may include a perch 100 or other similar ledge around which the tether 92 may be rolled.

In some embodiments, the tether 92 may be mounted to the vehicle interior 66 using a separate mounting bracket or other similar mounting device. Such mounting brackets are known in the art. However, such an arrangement may result in increased costs if an additional mounting bracket is required for the tether 92. Accordingly, costs may be saved by using the adapter 20 as a mechanism for mounting the tether 92 to the vehicle. This may occur by using a "loop" tether 93 as the tether 92. A loop tether 93 is a tether that includes a eyelet loop 104 or other similar feature. This loop 104 may be "looped around" the p-bracket 72. In some embodiments, the loop 104 may be looped around the looping portion 80 of the p-bracket 72. In this manner, the tether 92 is secured to the adapter 20. Accordingly, when the adapter 20 is secured to the vehicle surface 66, the tether 92 likewise is secured (mounted) to the vehicle. Thus, in some embodiments, the need for an additional mounting bracket to secure the tether 92 may be obviated.

In further embodiments, the adapter 20 may be designed such that when the tether loop 104 is positioned around the p-bracket 72, the adapter 20 engages or contacts the loop 104. In some embodiments, the adapter 20 may include an engagement flange 116. In some embodiments, the flange 116 may contact the loop 104 or other portions of the tether 92 that are positioned on top of the inflator 64. The flange 116 may be a tab, ledge, or other similar feature that operates to retain the tether 92. In some previously known systems, the tether 92 could become trapped between the mounting bracket used to attach the tether and the vehicle surface 66, thus creating the possibility that the tether will not be able to fully extend during deployment of the inflatable curtain. However, in the present apparatus 60, the contact between the adapter 20 (or the engagement flange 116) and the loop 104 pushes and holds the loop 104 and the tether 92 close to the inflator 64. Other ways of keeping the tether 92 close to the inflator 64 may also be used. By keeping the loop 104 and the tether 92 close to the inflator 64, the adapter 20 prevents the tether 92 from being trapped under the adapter 20 when the adapter 20 is being secured to the vehicle body. Thus, the tether 92 and the loop 104 is not "pinched" between the vehicle body (sheet metal) and the adapter 20, and the possibility that the adapter 20 will prevent the tether 92 from fully extending during deployment is greatly diminished. Moreover, as no additional mounting bracket is required to affix the tether 92, the apparatus 60 also ensures that the tether is not trapped between the tether mounting bracket and the vehicle surface 66.

In further embodiments, the adapter 20 may also be designed to compensate for any excess slack that may be in the tether 92. If there is excess slack in the tether 92, the tether 92 may loosely hang and interfere with the mounting process. Accordingly, some previously known systems have been designed in which a piece of tape or adhesive is added to adhere the tether to the inflator 64. This process is referred to as "hanking" the tether. Of course, in taping the slack to the inflator, additional effort, resources, and materials must be expended, thereby increasing the overall complexity and cost of the airbag system. However, embodiments of the adapter 20 may be designed to compensate for the excess slack in the tether 92, without requiring tape, adhesives or other previously known methods for "hanking." The adapter 20 may include a tether retainer 120 that is designed to retain slack in the tether 92. A variety of different features and/or devices may be used as the tether retainer 120. In fact, any device, feature, or element that is capable of retaining slack in the tether 92 may be used as the retainer 120.

In some embodiments, the tether retainer 120 is integral with the base 24 and/or the encircling portion 40. In other embodiments, the tether retainer 120 is an opening 124 that is added to the adapter 20. In these embodiments, a portion of the tether 92 may simply be pushed into the opening 124 (with a tool, with the installer's finger, etc.) as a means of eliminating and/or taking up slack in the tether 92. The opening 124 would thus retain the tether 92 during shipping and handling and/or installation/use of the vehicle, but would release the tether 92 so that the tether 92 could be fully extended during deployment of the inflatable curtain. The inclusion of this opening 124 is a simple and effective mechanism for retaining the tether 92.

In some embodiments, the opening 124 may be created by making three (or more) slices 128 in the adapter 20. These slices 128 may be incisions in the adapter 20 that have the same intersection point, thereby creating a "star"-shaped feature. In some embodiments, this "star" shaped feature is similar in appearance to an asterisk ("*"). These intersecting slices 128 create the opening 124 in which the tether 92 may be inserted into one or more of the slices 128 and/or into the intersection point. In some embodiments, the slices 128 are about 20 millimeters in length. However, other sizes and/or lengths for the slices 128 may also be used.

Figure 3:
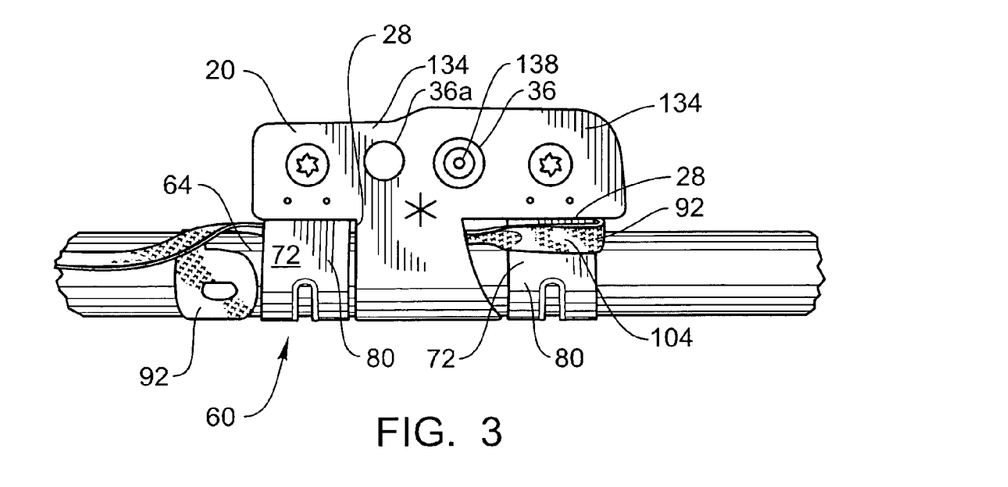
FIG. 3 is a perspective view of the back side of the apparatus of FIG. 2.

Referring now to FIG. 3, a perspective view illustrates the inner (back) side 134 of the apparatus 60. The inner side 134 of the adapter 20 is the side of the adapter 20 that contacts the vehicle surface 66 (shown in FIG. 3) when the adapter 20 is positioned within the vehicle. As shown in FIG. 3, the p-brackets 72 may pass through the slots 28 that are positioned on the adapter 20. In other embodiments, the tether 92 may pass through one or more of the slots 28 as a means of allowing the loop 104 to encircle and/or loop around the p-bracket 72. Further, as shown in FIG. 3, the p-brackets 72 operate to capture and/or encircle a portion of the inflator 64.

Further, as shown in FIG. 3, the tether 92 is held in the proper configuration, without any loops, folds, etc. The tether 92 may also be held proximate the top of the p-bracket 72. Those skilled in the art will appreciate where/how the tether 92 may be held in the optimal position.

An embodiment of the way in which the apparatus 60 may be mounted to the vehicle surface 66 (shown in FIG. 2) will now be discussed. First, the inflator 64 is positioned within the adapter 20. As noted above, this may occur by positioning the inflator 64 such that the encircling portion 40 encircles the inflator 64. The p-brackets 72 may also be used to surround the inflator 64. The tether 92 may also be secured and/or added to the apparatus 60. This may involve looping the loop 104 around one of the p-brackets 72.

Once the inflator 64 and/or the tether 92 have been secured to the adapter 20, the apparatus 60 may be "staged" to the vehicle surface 66. Such "staging" may involve one or more push pins 138 that pass through one of the openings 36 in the adapter 20. The push pin 138 (which is sometimes referred to as a "bird beak" or "fir tree" fastener) will be passed through the openings 36 and then may engage an opening (not shown) in the vehicle surface 66. The installer may, if necessary, punch/create an additional opening 36 in the base 24. If the adapter 20 is made of polyethylene (or even metal), this opening can easily be added with a punch or other similar device capable of creating holes. In this manner, the installer can customize the exact location of the opening 36 and the push pin 138 in the base 24. The location of the opening in the vehicle surface 66 can also be adjusted in a similar manner, if desired.

By using already established openings and/or by creating openings in the desired locations, the airbag installer can "stage" the apparatus 60 to the vehicle in a variety of different vehicle locations, in a variety of different orientations, positions, angles, configurations, etc. Such "staging" may be accomplished in any orientation, location, etc. that is needed, without the apparatus 60 falling out of its mount. Such "staging" may further occur in any orientation, location, regardless of whether the vehicle is a compact car, a truck, an SUV, a sedan, etc. Accordingly, the airbag installer will have a greater amount of flexibility in staging the apparatus 60 to the vehicle. Moreover, by using the present embodiments, such "staging" of the apparatus 60 (including the inflator 64) is accomplished without expensive hooks or other immovable parts being added to the adapter 20 and/or the apparatus 60. Thus, the engagement provided by the staging "hook" may be taken off of an expensive metal part and has been replaced with a relatively cheap, moveable part. By removing the staging hooks, the amount of steel needed to mount the airbag system is greatly reduced, and may (in some embodiments) result in a net savings to the airbag manufacture of about 30% steel blank. Of course, this 30% is simply an example. Other embodiments may save a greater or lesser amount of material.

In further embodiments, it is estimated that each adapter 20 may be made inexpensively, such as for about 15 cents or less, thus resulting in significant savings for the manufacturer. In other embodiments, the adapter 20 may be made of low-density polyethylene ("LDPE"), and may have a total price of less than 10 cents per adapter. Moreover, if the adapter 20 is made of recycled LDPE, the overall cost of the part may be as low as 5 cents per adapter, and may provide a significant way for the manufacture to recycle and/or reuse their waste/scrap materials.

Once the apparatus 60 has been "staged" to the vehicle surface 66, one or more fasteners may be added to permanently affix the apparatus 60 to the vehicle surface 66. In some embodiments, the fasteners may be the fasteners 73 (shown in FIG. 2) that are used for the p-brackets 72. In other embodiments, the fasteners may be different fasteners such as bolts, etc. that secure the apparatus to the surface 66. Of course, the exact position, length, and/or configuration of the fasteners may vary depending upon the particular embodiment. In some embodiments, these fasteners may be an "M6" bolt with a pushnut that are passed through openings 36 in the adapter 20. Other types of fasteners may also be used. Once the fasteners have been torqued and secured tightly, the apparatus 60 and the inflator 64 will be affixed within the vehicle.

In other embodiments, the apparatus 60, once staged, may be used in conjunction with conventional mounting brackets (not shown). These mounting brackets may be used to secure the inflatable curtain (not shown) to the vehicle surface 66 or may be used to further secure the inflator 64, the tether 92, etc., as necessary. Any and all mounting brackets known in the art may be used in conjunction with the present embodiments. However, in some embodiments, the mounting bracket used may not include expensive staging hooks, or other devices used to stage the inflator. Rather, in some embodiments, the staging of the inflator is accomplished by the adapter 20.

Because the apparatus 60 may be staged in a variety of different locations, orientations, etc., the airbag manufacture may not be required to use different types of mounting brackets for each particular vehicle design. Rather, the apparatus 60 allows the position of the apparatus 60 and/or the inflator 64 to be adjusted, modified, oriented differently, etc. so that the same mounting brackets may be "crossed-over" into other vehicle designs. In fact, some embodiments may be designed in which a generic metal bracket, that does not have any staging hooks, is used to mount the inflatable curtain (or other portions of the inflatable curtain). As a result, the airbag manufacturer has much more flexibility in the design, position, and components of the inflatable curtain system, and thus, the overall production costs associated with the airbag systems may decrease.

Figure 4:
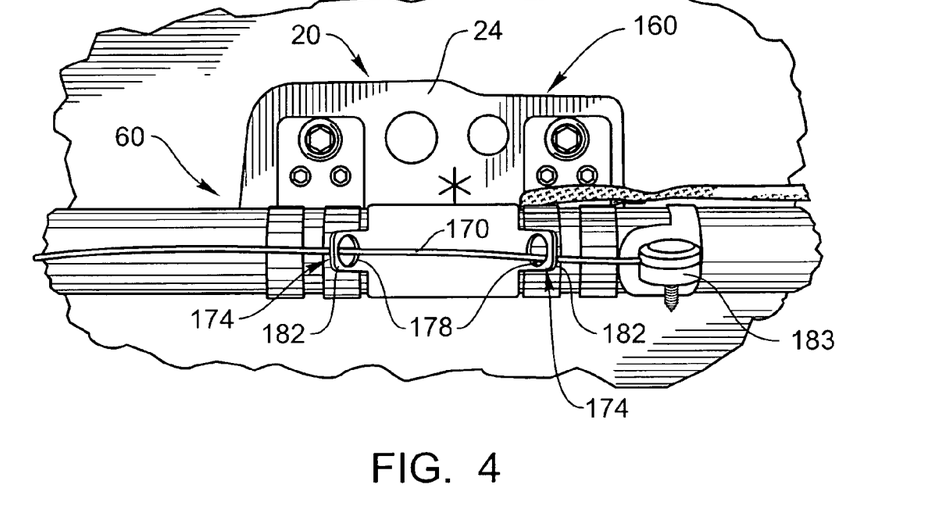
FIG. 4 is a perspective view of the front side of another embodiment of an apparatus that may be used to mount an inflator to a vehicle for use with an inflatable curtain airbag system.

Referring now to FIG. 4, an additional embodiment of an apparatus 160 is illustrated. The apparatus 160 of FIG. 4 is similar to the apparatus 60 of FIG. 2. Accordingly, many of the features and/or elements of the apparatus 60 may likewise be incorporated into the apparatus 160. For purposes of brevity, the discussion of these features/elements will not be repeated.

In the embodiment shown in FIG. 4, a wire harness 170 has been added to the apparatus 160. Those of skill in the art will recognize that a wire harness 170 may also be used, as desired, with the apparatus 60 of FIG. 2. The wire harness 170 comprises a series of wires that may, in some embodiments, be used to connect the inflator 64 to a control unit (not shown), a sensor (not shown) that detects crash conditions, or another portion of the airbag system. The wire harness 170 may also be attached to an end 183 that may be attached, as desired, to other portions of the vehicle. Some of these embodiments may be designed in which an electrical signal may be transmitted to the inflator 64 to indicate crash conditions by means of the wire harness 170. However, in other embodiments, the wire harness 170 may be part of a different vehicle system (including a different type of electrical system within the vehicle).

In some embodiments, the wire harness 170 may be secured or retained to ensure that the wire harness 170 does not interfere with the airbag mounting process and/or the proper functioning of the airbag system. Some previously known systems would use fasteners of various types, to secure the wire harness 170 to the body of the vehicle. The fasteners, materials and time required to secure the wire harness 170 to the vehicle increases the overall production costs of the inflatable curtain airbag system. In the embodiment of FIG. 4, the wire harness 170 is retained by the adapter 20. This may be accomplished via a wire harness retainer 174 that retains the wire harness 170. In some embodiments, the wire harness retainer 174 comprises a portion of the adapter 20. In other embodiments, the wire harness retainer 174 may be attached to the adapter 24 and/or the encircling portion 40. In other embodiments, the wire harness retainer 174 is added to the base 24, the p-brackets 72, or other portions of the apparatus 160. In further embodiments, the wire harness retainer 170 includes an opening 178 is added directly to the base 24, the encircling portion 40, etc., without requiring the use of the flanges 182. In some embodiments, the opening 178 may be a cutout. Other configurations are also possible.

The wire harness retainer 174 may comprise a flange 182 and a opening 178 (which may also be referred to as a cutout 178). The cutout 178 is an opening that is added to the flange 182. More than one flange 182 may be used. The wire harness 170 may be passed through the cutout 178. Once the wire harness 170 has been passed through the cutout 178, the wire harness 170 may be routed, as desired, proximate the adapter 20 and/or the inflator 64.

By having the wire harness 170 pass through the cutout 178, the wire harness 170 is secured and held into position, without the need of additional fasteners. In fact, by using the retainer 174, two or more fasteners may be removed from the inflatable curtain assembly. The money saved from the removal of these two fasteners on a mass-produced vehicle is significant and may, in some embodiments, pay for adapter 20 by itself (and/or, the apparatus 160, etc.)

In some embodiments, the cutout 178 will be a "star" or "asterisk" shaped opening that is similar to the opening 124 (shown in FIG. 2). This cutout 178 may be formed by making slices into the adapter 20. In other embodiments, the retainer 174 may be a clamp, an aperture, a clip, or other element/feature that is capable of retaining the harness 170 (including those feature(s) through which the harness 170 may be passed). Other shapes and/or configurations for the cutout 178, such as a simple opening, may also be used.

Figure 5:
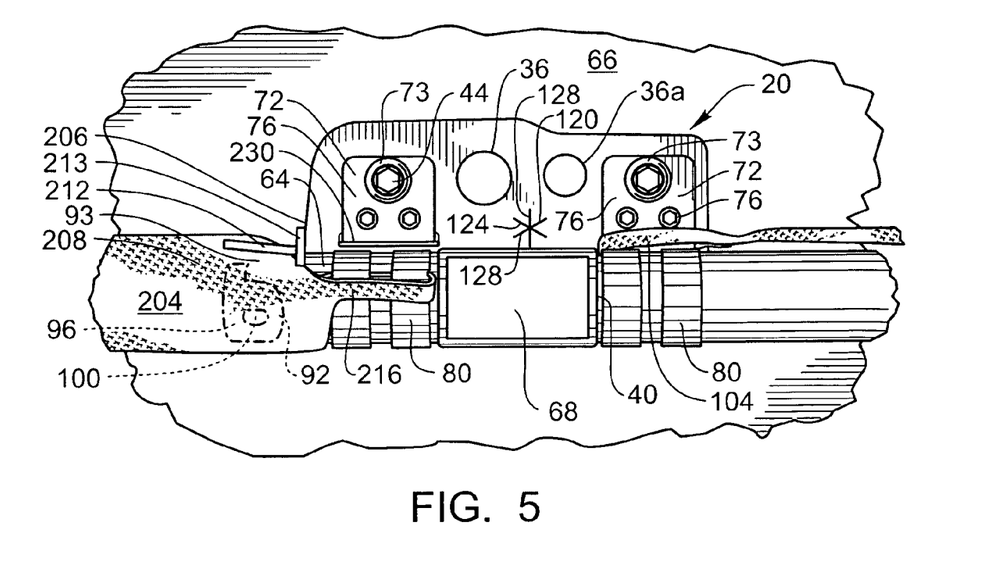
FIG. 5 is a perspective view of the front side of a further embodiment of an apparatus that may be used to mount an inflator to a vehicle for use with an inflatable curtain airbag system.

Referring now to FIG. 5, the embodiment of the apparatus 60 of FIG. 2 is illustrated being used to attach an inflator 64 to a vehicle surface 66. However, unlike FIG. 2, FIG. 5 shows the apparatus 60 also being used in conjunction with an inflatable curtain airbag 204 (which is sometimes referred to simply as the "inflatable curtain"). The inflatable curtain 204 is positioned in the stowed, undeployed configuration. As noted above, this stowed configuration is designed such that it may be positioned on or proximate the lateral side of the vehicle. The inflatable curtain 204 is designed so that in the event of an accident or crash, the inflatable curtain 204 will deploy and cover the lateral side of the vehicle.

The inflatable curtain 204 may be positioned proximate a leading edge 206 of the adapter 20. The inflatable curtain 204 is in fluid communication with the inflator 64. Accordingly, when the inflator 64 deploys, inflation gas (not shown) will be channeled into the inflatable curtain 204 to deploy the curtain airbag 204. The inflatable curtain 204 may be mounted using mounting brackets of the type known in the art (including steel mounting brackets). These brackets may or may not include staging hooks. As described above, in some situations, the mounting brackets may be applicable in a variety of different vehicle designs, vehicle sizes, etc.

As is known in the art, the inflatable curtain 204 may include a sock 208 that covers the inflatable curtain 204 and holds the inflatable curtain 204 in the stowed configuration. An anti-twist feature 212 may also be added to the inflatable curtain 204 to prevent the inflatable curtain 204 from twisting, becoming folded, or otherwise arranged in a manner that would inhibit proper deployment. In some embodiments, the sock 208 may be installed over the p-bracket 72, in a manner similar to the tether loop 104 (discussed above).

The anti-twist feature 212 shown in FIG. 5 is a bar that engages a portion of the adapter 20 (such as the leading edge 206). Further embodiments are designed in which a tab 213 is added to the adapter 20 such that the feature 212 engages the tab 213. This engagement holds the curtain 204 in the proper position and prevents the curtain 204 from twisting. Other embodiments may be designed in which the feature 212 engages other portions of the apparatus 60. Further, FIG. 5 depicts the anti-twist feature 212 as a bar. However, this disclosure is not limiting. Any other feature that is capable of preventing the curtain 204 from twisting may be used. It should be noted that, by having the anti-twist feature 212 engage the adapter 20 (or other portion of the apparatus 60), some cost savings may be achieved. Specifically, some previous systems are designed in which hooks or other similar features are used to engage the anti-twist feature 212 to prevent the curtain 204 from twisting. By having the feature 212 engage a portion of the apparatus 60 (or the adapter 20), the need for these additional hooks or other features is obviated. As such, the manufacturer does not need to spend additional monies on these hooks, etc.

The adapter 20 may further be designed to retain the sock 208. This may be accomplished in a manner that is similar to the retention of the tether 92 discussed above. As shown in FIG. 5, the sock 208 may be positioned over one of the p-brackets 72 (and more specifically, over the forward p-bracket 72). In order to facilitate such positioning of the sock 208, the sock 208 may include a loop 216 that can be looped around the p-bracket 72. The adapter may further include a sock retainer 230. This sock retainer 230 is a tab or flange that engages the sock 208. The retainer 230 holds the sock 208 proximate the inflator 64, thereby preventing a portion of the sock 208 from becoming trapped between the adapter 20 and the vehicle surface 66.

It should be noted that, in some embodiments, the loop is an "anti-twist" loop that looped around the p-bracket 72, in the same manner as the tether 92. This looping of the sock acts as an anti-twisting feature that holds the sock in the proper position and prevents the curtain or the sock from twisting. Similarly, in other embodiments, the loop may engage the anti-twist feature 212. This feature 212 further restrains or engages the sock and prevents the sock/curtain from twisting.

In some embodiments, this retention of the sock 208 proximate the inflator 62 may be advantageous. Such positioning of the sock 208 may ensure that an anti-twist feature 212 functions properly. An anti-twist feature is a hook or other feature on the curtain that engages the vehicle and ensures that the curtain does not twist, bend, or otherwise become positioned in a less-favorable or non-optimal position. By ensuring that no portion of the sock 208 becomes pinched between the vehicle surface 66 and the adapter 20, the adapter 20 ensures that this anti-twist feature will perform properly and will not be compromised. Similarly, holding the sock 208 in the proper position, as described above, further allows the anti-twist feature to function properly. In some embodiments, the retainer 230 actually retains the anti-twist feature close to the inflator 64. In further embodiments, the retention of the sock 208 allows the adapter and/or the mounting bracket (not shown, which may be for the inflator, for the inflatable curtain, etc.), to perform the functionality of the anti-twist feature. In some embodiments, the retainer 230 may be similar and/or identical to the retainer 116 discussed above. However, other structures and/or elements may be used to retain the curtain 204 and/or the sock 208, as desired.

Figure 6:
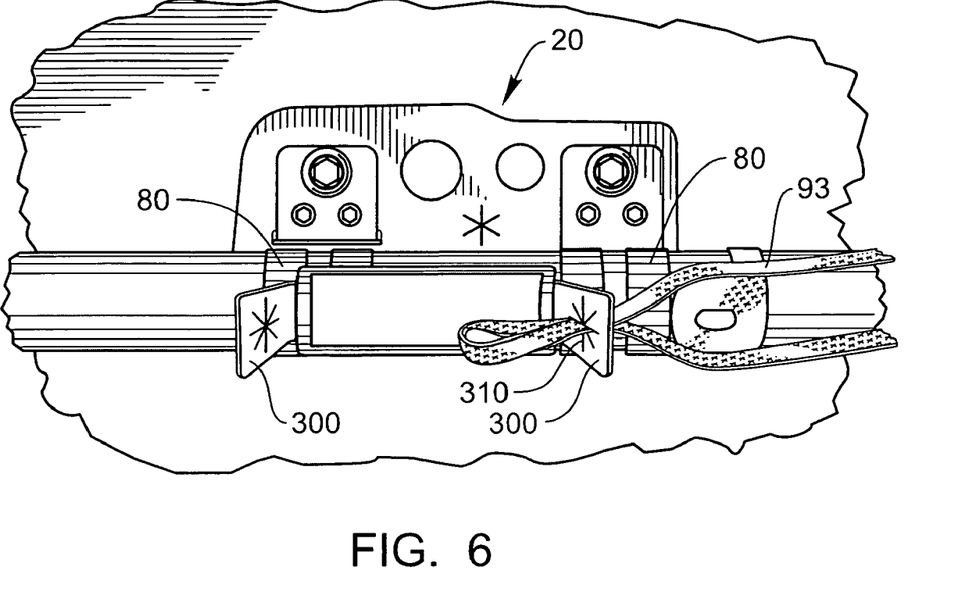
FIG. 6 is a perspective view of the front side of a further embodiment.

FIG. 6 shows a perspective view of a further embodiment of an adapter 20 according to the present embodiments. The adapter 20 is similar to that which is discussed and disclosed above. Specifically, the embodiment shown in FIG. 6 include one or more tabs 300 that are added proximate the looping portions 88. These tabs 300 include one or more star-shaped cutouts 310 that is designed to retain slack in the tether 93. Such retention of the tether slack may be appropriate during shipment or even during storage. In the event of deployment, the tether 93 may easily pull out of the cutout 310 to properly deploy. The benefit may be in labor savings because all the operator does to reduce slack is push the tether through the cutout. No tape or other slack reducer is required. Once restrained, the tether won't hinder assembly procedures. It should be noted that the cutout 301 is added to the tabs 300 in FIG. 6. However, the cutout 300 may be positioned at any other location in the adapter 20, as desired.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An apparatus for mounting an airbag inflator to a vehicle, the apparatus comprising:
    a mounting adapter comprising a base and at least one slot, wherein the base captures the inflator;
    a p-bracket that engages the slot, wherein the p-bracket captures the inflator; and
    a mounting tether looped around the p-bracket.

2. An apparatus as in claim 1 wherein the adapter receives a label, wherein the label is positioned on an encircling portion of the adapter.

3. An apparatus as in claim 1 further comprising a tether retainer that retains slack in the tether.

4. An apparatus as in claim 3 wherein the tether retainer comprises an opening and a portion of the tether is pushed into the opening.

5. An apparatus as in claim 1 further comprising a wire harness retained by the adapter.

6. An apparatus as in claim 5 wherein the adapter comprises a flange that includes an opening, wherein the wire harness is retained by threading the wire through the opening.

7. An apparatus as in claim 1 further comprising a retainer that retains an airbag sock proximate the inflator.

8. An apparatus as in claim 1 wherein the tether further comprises an eyelet loop, wherein the adapter holds the eyelet loop proximate the inflator.

9. An apparatus as in claim 1, wherein the apparatus operates to mount the tether to the vehicle without the use of a separate inflator bracket.

10. An apparatus for mounting an airbag inflator to a vehicle, the apparatus comprising:
    a mounting adapter comprising a base and two slots, wherein the base captures the inflator;
    two p-brackets, wherein each of the p-brackets engage a different slot, wherein each p-bracket captures the inflator;
    a mounting tether that includes an eyelet loop, wherein the eyelet loop is looped around the p-bracket; and
    a tether retainer that retains slack found in the tether, wherein the tether retainer comprises an opening.

11. An apparatus as in claim 10 further comprising a wire harness retained by the adapter, wherein the adapter comprises a flange that includes an opening, wherein the wire harness is retained by threading the wire through the opening.

12. An apparatus as in claim 10 further comprising a tab that engages an anti-twist feature positioned on an airbag sock.

13. An apparatus as in claim 10 further comprising a retainer that retains an airbag sock proximate the inflator.

14. An apparatus as in claim 10, wherein a portion of the tether is pushed into the opening.

15. A method for attaching an airbag inflator to a vehicle, the method comprising:
    obtaining a mounting apparatus, the apparatus comprising a mounting adapter comprising a base and at least one slot, wherein the base captures the inflator, a p-bracket that engages the slot, wherein the p-bracket captures the inflator, and a mounting tether looped around the p-bracket;
    staging the inflator to the vehicle using the mounting apparatus by inserting a push pin into an opening on a vehicle surface;
    securing the mounting apparatus to the vehicle via one or more bolts.

16. A method as in claim 15 wherein the step of staging the inflator comprises engaging the apparatus with one or more holes in the vehicle.

* * * * *

UNITED STATES PATENT AND TRADEMARK OFFICE
CERTIFICATE OF CORRECTION

PATENT NO. : 7,677,595 B2  Page 1 of 1
APPLICATION NO. : 12/009540
DATED : March 16, 2010
INVENTOR(S) : David L. Dominissini et al.

It is certified that error appears in the above-identified patent and that said Letters Patent is hereby corrected as shown below:

Please change Field 74 Attorney, Agent, or Firm from "Madison IP, P.C." to --Madson IP, P.C.--

In column 10, line 52, please replace "an opening 178 is added" with --an opening 178 that is added--

Signed and Sealed this

Fourth Day of May, 2010

David J. Kappos
*Director of the United States Patent and Trademark Office*